United States Patent
Yu et al.

(10) Patent No.: US 12,016,037 B2
(45) Date of Patent: Jun. 18, 2024

(54) METHOD AND USER EQUIPMENT FOR BEAM INDICATION FOR UPLINK TRANSMISSION

(71) Applicant: FG Innovation Company Limited, Tuen Mun (HK)

(72) Inventors: Chia-Hao Yu, Taipei (TW); Jia-Hong Liou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 265 days.

(21) Appl. No.: 17/508,364

(22) Filed: Oct. 22, 2021

(65) Prior Publication Data
US 2022/0132550 A1    Apr. 28, 2022

Related U.S. Application Data

(60) Provisional application No. 63/105,160, filed on Oct. 23, 2020.

(51) Int. Cl.
*H04W 72/23* (2023.01)
*H04W 72/1273* (2023.01)

(52) U.S. Cl.
CPC ........ *H04W 72/23* (2023.01); *H04W 72/1273* (2013.01)

(58) Field of Classification Search
CPC .. H04B 7/0404; H04B 7/0617; H04B 7/0695; H04L 1/1854; H04L 5/001; H04L 5/0023;
(Continued)

(56) References Cited

U.S. PATENT DOCUMENTS

| 11,095,415 B2 * | 8/2021 | Papasakellariou .... H04L 1/1861 |
| 11,497,021 B2 * | 11/2022 | Onggosanusi ....... H04B 7/0695 |

(Continued)

FOREIGN PATENT DOCUMENTS

| CA | 3076273 A1 * | 3/2019 | .......... H04B 7/0617 |
| CA | 3076273 C * | 9/2023 | .......... H04B 7/0617 |

(Continued)

OTHER PUBLICATIONS

ZTE, "Enhancements on Multi-Beam Operation", R1-2005454, 3GPP TSG RAN WG1 Meeting #102-e, Aug. 17-28, 2020.
(Continued)

*Primary Examiner* — Eric Nowlin
(74) *Attorney, Agent, or Firm* — ScienBiziP, P.C.

(57) ABSTRACT

A method and a user equipment for beam indication for UL transmission are provided. The method includes: receiving a first configuration for configuring a plurality of first TCI states, each of the plurality of first TCI states applied for a PUCCH and a PUSCH; receiving a MAC-CE for activating one or more first TCI states from the plurality of first TCI states; receiving first DCI indicating one of the one or more first TCI states activated by the MAC-CE, the first DCI comprising one field for indicating scheduling information for a PDSCH, the indicated scheduling information being invalid for the PDSCH; transmitting a HARQ-ACK on a PUCCH resource determined by another one field in the first DCI when receiving the first DCI; and transmitting the PUCCH and the PUSCH based on a spatial TX parameter derived according to the indicated first TCI state after transmitting the HARQ-ACK.

14 Claims, 2 Drawing Sheets

(58) Field of Classification Search
CPC ... H04L 5/0044; H04L 5/0048; H04L 5/0055; H04L 5/0091; H04W 72/1273; H04W 72/23

See application file for complete search history.

(56) References Cited

U.S. PATENT DOCUMENTS

| | | | |
|---|---|---|---|
| 11,637,666 B2 * | 4/2023 | Grant | H04L 5/0044 370/329 |
| 2020/0007296 A1 * | 1/2020 | Papasakellariou | H04L 5/0053 |
| 2020/0196383 A1 | 6/2020 | Tsai et al. | |
| 2020/0280409 A1 * | 9/2020 | Grant | H04L 5/0044 |
| 2021/0105812 A1 * | 4/2021 | Rastegardoost | H04L 1/08 |
| 2021/0136741 A1 * | 5/2021 | Onggosanusi | H04W 72/23 |
| 2021/0259004 A1 * | 8/2021 | Takeda | H04L 1/08 |
| 2022/0039129 A1 * | 2/2022 | Takeda | H04W 72/046 |
| 2022/0132550 A1 * | 4/2022 | Yu | H04W 72/23 |
| 2022/0272706 A1 * | 8/2022 | Sengupta | H04W 52/18 |
| 2023/0136113 A1 * | 5/2023 | Guo | H04L 5/0094 370/329 |
| 2023/0184883 A1 * | 6/2023 | Li | G01S 13/003 342/59 |

FOREIGN PATENT DOCUMENTS

| | | | | |
|---|---|---|---|---|
| CN | 109802787 A | | 5/2019 | |
| CN | 110958693 A | | 4/2020 | |
| CN | 111357230 A | * | 6/2020 | H04B 7/0617 |
| CN | 112368971 A | * | 2/2021 | H04L 1/1854 |
| CN | 112567800 A | * | 3/2021 | H04B 7/02 |
| KR | 20200052920 A | * | 5/2020 | |
| KR | 20210000739 A | * | 1/2021 | |
| KR | 102542351 B1 | * | 6/2023 | |
| WO | WO-2019049096 A1 | * | 3/2019 | H04B 7/0617 |
| WO | WO-2019244221 A1 | * | 12/2019 | H04B 7/02 |
| WO | WO-2020009383 A1 | * | 1/2020 | H04L 1/1854 |
| WO | 2020/162728 A1 | | 8/2020 | |
| WO | 2020/165702 A1 | | 8/2020 | |
| WO | WO-2021143847 A1 | * | 7/2021 | H04B 7/0404 |
| WO | WO-2022153492 A1 | * | 7/2022 | H04W 16/28 |

OTHER PUBLICATIONS

3GPP TS 38.213, "3rd Generation Partnership Project; Technical Specification Group Radio Access Network; NR; Physical layer procedures for control (Release 16)", Technical Specification, V16.2.0 (Jun. 2020).

3GPP TS 38.321, "3rd Generation Partnership Project; Technical Specification Group Radio Access Network; NR; Medium Access Control (MAC) protocol specification (Release 16)", Technical Specification, V16.1.0 (Jul. 2020).

3GPP TS 38.214, "3rd Generation Partnership Project; Technical Specification Group Radio Access Network; NR; Physical layer procedures for data (Release 16)", Technical Specification, V16.2.0 (Jun. 2020).

3GPP TS 38.331, "3rd Generation Partnership Project; Technical Specification Group Radio Access Network; NR; Radio Resource Control (RRC) protocol specification (Release 16)", Technical Specification, V16.1.0 (Jul. 2020).

* cited by examiner

METHOD AND USER EQUIPMENT FOR BEAM INDICATION FOR UPLINK TRANSMISSION

CROSS-REFERENCE TO RELATED APPLICATION(S)

The present disclosure claims the benefit of and priority to U.S. Provisional Patent Application Ser. No. 63/105,160, filed on Oct. 23, 2020, entitled "UL BEAM-BASED OPERATION WITH UNIFIED INDICATION AND FRAMEWORK" ("the '160 provisional"). The contents of the '160 provisional are hereby incorporated fully by reference into the present disclosure for all purposes.

FIELD

The present disclosure is related to wireless communication, and more particularly, to a method and a user equipment (UE) for beam indication for uplink (UL) transmission in next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and a user equipment for beam indication for uplink transmission in the next generation wireless communication networks.

In a first aspect of the present disclosure, a method performed by a user equipment (UE) for beam indication for uplink (UL) transmission is provided. The method includes: receiving a first configuration for configuring a plurality of first Transmission Configuration Indication (TCI) states, each of the plurality of first TCI states applied for at least one Physical Uplink Control Channel (PUCCH) and at least one Physical Uplink Shared Channel (PUSCH); receiving a Medium Access Control-Control Element (MAC-CE) for activating one or more first TCI states from the plurality of first TCI states; receiving first Downlink Control Information (DCI) indicating one of the one or more first TCI states activated by the MAC-CE, the first DCI comprising at least one field for indicating scheduling information for a Physical Downlink Shared Channel (PDSCH), the indicated scheduling information being invalid for the PDSCH; transmitting a Hybrid Automatic Repeat Request-Acknowledgement (HARQ-ACK) on a PUCCH resource determined by another one field in the first DCI in response to the reception of the first DCI; and transmitting the at least one PUCCH and the at least one PUSCH based on a spatial transmitter (TX) parameter derived according to the indicated first TCI state after transmitting the HARQ-ACK.

In an implementation of the first aspect of the present disclosure, the method further includes: receiving a second configuration for configuring a second TCI state. The MAC-CE is used to indicate to the UE the second TCI state.

In an implementation of the first aspect of the present disclosure, the second TCI state is applied only for receiving a PDSCH scheduled by second DCI.

In an implementation of the first aspect of the present disclosure, the indicated first TCI state is not applied for the PUCCH resource used for transmitting the HARQ-ACK.

In an implementation of the first aspect of the present disclosure, the first DCI is not an uplink (UL) grant.

In an implementation of the first aspect of the present disclosure, the first DCI is a UE-specific DCI or a common DCI.

In an implementation of the first aspect of the present disclosure, the method further includes: transmitting, after transmitting the HARQ-ACK, at least one of a periodic Sounding Reference Signal (SRS), a semi-persistent SRS, an aperiodic SRS, an SRS for beam management and a UL positioning reference signal based on the spatial TX parameter derived according to the indicated first TCI state.

In an implementation of the first aspect of the present disclosure, at least one of a Sounding Reference Signal (SRS) for beam management, an SRS for non-codebook (NCB)-based transmission, a PUSCH for NCB-based transmission, a Physical Random Access Channel and an SRS for positioning is not applied for the indicated first TCI state.

In a second aspect of the present disclosure, a UE for beam indication for uplink (UL) transmission is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive a first configuration for configuring a plurality of first Transmission Configuration Indication (TCI) states, each of the plurality of first TCI states applied for at least one Physical Uplink Control Channel (PUCCH) and at least one Physical Uplink Shared Channel (PUSCH); receive a Medium Access Control-Control Element (MAC-CE) for activating one or more first TCI states from the plurality of first TCI states; receive first Downlink Control Information (DCI) indicating one of the one or more first TCI states activated by the MAC-CE, the first DCI comprising at least one field for indicating scheduling information for a Physical Downlink Shared Channel (PDSCH), the indicated scheduling information being invalid for the PDSCH; transmit a Hybrid Automatic Repeat Request-Acknowledgement (HARQ-ACK) on a PUCCH resource determined by another one field in the first DCI in response to the reception of the first DCI; and transmit the at least one PUCCH and the at least one PUSCH based on a spatial transmitter (TX) parameter derived according to the indicated first TCI state after transmitting the HARQ-ACK.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
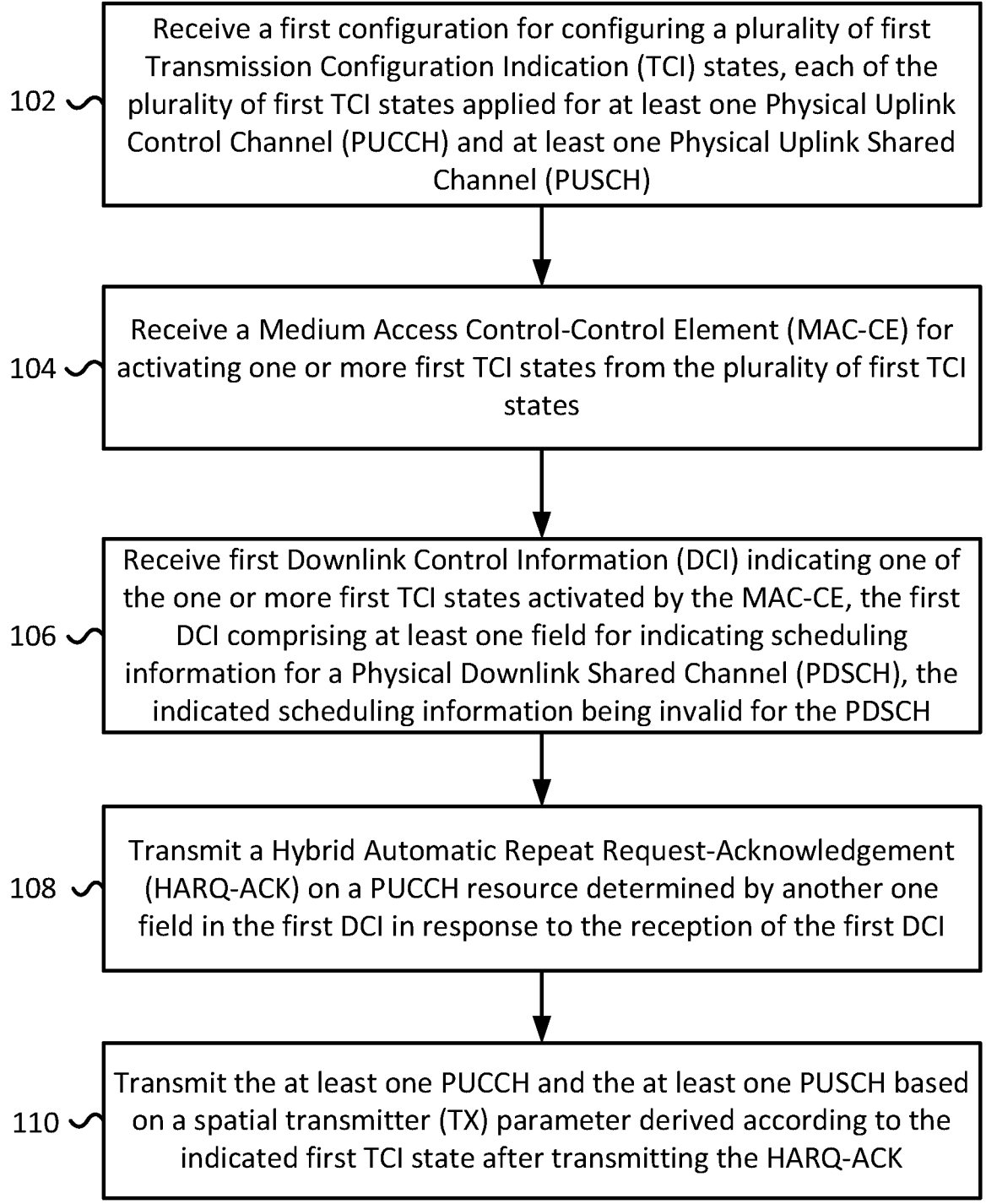
FIG. 1 is a flowchart illustrating a method performed by a UE for beam indication for uplink (UL) transmission according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, at least downlink (DL) transmission data, a guard period, and uplink (UL) transmission data should be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

Beam: The term "beam" may be replaced by the term "spatial filter." For example, when a UE reports a preferred gNB TX beam, the UE is essentially selecting a spatial filter used by the gNB. The term "beam information" is used to provide information about which beam/spatial filter is being used/selected. Individual reference signals are transmitted by applying individual beams/spatial filters. Thus, the term "beam" or "beam information" may be represented by the term "reference signal resource index(es)."

Antenna Panel: It may be assumed that an antenna panel is an operational unit for controlling a transmit spatial filter/beam. An antenna panel is typically consisted of a plurality of antenna elements. A beam can be formed by an antenna panel and in order to form two beams simultaneously, two antenna panels are needed. Such simultaneous beamforming from multiple antenna panels is subject to UE capability. A similar definition for "antenna panel" may be possible by applying spatial receiving filtering characteristics.

Hybrid Automatic Repeat Request (HARQ): A functionality ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TB s. There is one HARQ entity per serving cell. Each of HARQ entity supports a parallel of DL and UL HARQ process.

Timer: A Medium Access Control (MAC) entity may setup one or more timers for individual purposes, for example, triggering some uplink signaling retransmission or limiting some uplink signaling retransmission period. A timer is running once it is started, until it is stopped or until it expires; otherwise, it is not running. A timer can be started if it is not running, or can be restarted if it is running. A timer is always started or restarted from an initial value. The initial value can be but not limited to be configured by the gNB via downlink Radio Resource Control (RRC) signaling.

Bandwidth Part (BWP): A subset of the total cell bandwidth of a cell is referred to as a BWP and beamwidth part adaptation is achieved by configuring the UE with BWP(s) and telling the UE which of the configured BWPs is currently the active one. To enable Bandwidth Adaptation (BA) on a Primary Cell (PCell), the gNB configures the UE with UL and DL BWP(s). To enable BA on Secondary Cells (SCells) in case of Carrier Aggregation (CA), the gNB configures the UE with DL BWP(s) at least (i.e., there may be none in the UL). For the PCell, the initial BWP is the BWP used for initial access. For the SCell(s), the initial BWP is the BWP configured for the UE to first operate at SCell activation. The UE may be configured with a first active uplink BWP by a firstActiveUplinkBWP Information Element (IE). If the first active uplink BWP is configured for a Special Cell (SpCell), the firstActiveUplinkBWP IE field contains the Identity (ID) of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the UL BWP to be used upon MAC-activation of an SCell.

Quasi Co-Location (QCL): Two antenna ports are said to be quasi co-located if properties of the channel over which a symbol on one antenna port is conveyed can be inferred from the channel over which a symbol on the other antenna port is conveyed. The properties of the channel may include Doppler shift, Doppler spread, average delay, delay spread, and spatial RX parameters. These properties are categorized into different QCL types in NR specifications. For example, QCL-TypeD refers to spatial RX parameter. QCL-TypeD is also referred to "beam" in the present disclosure.

TCI state: a TCI state contains parameters for configuring a QCL relationship between one or two DL reference signals and a target reference signal set. For example, a target reference signal set may be the Demodulation Reference Signal (DMRS) ports of PDSCH or Physical Downlink Control Channel (PDCCH).

For a QCL assumption indication in DL, TCI framework is introduced in 3GPP NR Release 15/16 (Rel-15/16). In 3GPP NR Rel-15/16, different QCL types have been defined for indicating different parameters for DL synchronization purpose, including timing/frequency/spatial domain synchronization. Among them, spatial domain synchronization may be often referred to as a beam or spatial filter. For UL synchronization in a spatial or beam domain, a spatial relation information parameter has been introduced since 3GPP NR Rel-15 NR. One of the reasons for applying different principles for indicating DL/UL spatial domain filter characteristics is that the overhead on synchronization parameters in the UL direction is less than in the DL direction.

The beam indication for DL channels/signals may be a TCI (which includes beam indication information) indication for DL CSI-RS. For periodic CSI-RS, the TCI may be configured by RRC. For semi-persistent (SP) CSI-RS, the TCI may be provided by MAC-CE when the SP CSI-RS is activated. For aperiodic (SP) CSI-RS, the TCI may be configured by RRC in associated trigger states.

The beam indication for DL channels/signals may be a TCI indication for PDSCH. A first set of TCI states may be configured by RRC. The MAC-CE signaling may activate a subset from the first set of TCI states for beam indication or reception of the PDSCH. The DCI signaling may dynamically indicate one TCI state for scheduled PDSCH transmission.

The beam indication for DL channels/signals may be a TCI indication for PDCCH. A second set of TCI states may be configured by RRC for the PDCCH. The configuration for the second set of TCI states may be per-Control Resource Set (CORESET) signaling. The MAC-CE signaling may activate one from the second set of TCI states. The second set of TCI states may be a subset of the first set of TCI states.

The beam indication for UL channels/signals may be a beam indication for a UL Sounding Reference Signal (SRS). For periodic SRS, the spatial transmission property (e.g., beam indication for UL) may be configured by RRC. For an SP/aperiodic (AP) SRS, the spatial transmission property may be provided and/or updated by MAC-CE signaling.

The beam indication for UL channels/signals may be a beam indication for a PUCCH. A set of spatial transmission properties may be configured by RRC for PUCCH resources. The MAC-CE signaling may be used to activate one spatial transmission property from the set of spatial transmission properties for transmission of a PUCCH resource.

The beam indication for UL channels/signals may be a beam indication for a PUSCH. The spatial transmission property of PUSCH transmission may refer to one or more RRC-configured SRS resources. The DCI signaling may be used to indicate one spatial transmission property, from the one or more RRC-configured SRS resources, for a scheduled PUSCH transmission. By referring to an RRC-configured SRS resource as spatial transmission property, the PUSCH transmission may assume same spatial transmission property as that applied for the referred RRC-configured SRS resource. The spatial transmission property of the RRC-configured SRS resource may be updated by MAC-CE signaling.

To simplify beam indication overhead, the common beam indication may be applied for a set of channels and/or signals, instead of indicating beam information individually. To enable common beam operation, the following (a)-(d) may need to be considered. (a) Applicable channels/signals. The targeting channels/signals for common beam indication signaling may need to be clarified in terms of the applicable transmission directions, the applicable channels (if not all) and the applicable signals (if not all). If the applicable transmission directions include both DL and UL directions, a joint DL/UL common beam indication may be applied. If the applicable transmission directions include one of DL and UL directions, a separate DL/UL common beam indication may be applied. (b) Number of common beams to be supported. (c) Default beam behavior and conditions when a default beam behavior is needed. (d) Common beam configuration.

The joint DL/UL common beam operation may assume that a same common beam indication is applicable to the channels/signals in both DL and UL directions. This may require beam correspondence capability to be supported for a concerned UE. A beam correspondent UE may not always perform the joint DL/UL common beam operation when the separate DL/UL common beam operation is, for example, enabled by the network (NW). There may be situations where different beams are preferred for DL reception and UL transmission, for example, due to Maximum Power Emission (MPE) considerations. In this situation, even though beam correspondence and the joint common beam operation are supported by the UE, the separate DL/UL common beam operation may be applied. The separate DL common beam operation may assume that a common beam indication is applicable to the DL channels/signals. The separate UL common beam operation may assume that a common beam indication is applicable to the UL channels/signals.

In the following, the DL common beam operation and the UL common beam operation are described. The need for the DL common beam operation and for the UL common beam operation may depend on the common beam scenario configured/indicated by the NW. For joint DL/UL common beam operation, either the DL common beam indication or the UL common beam indication may be signaled/indicated to the UE. In some implementations, only the DL common beam indication may be signaled/indicated and the UL common beam may follow the DL common beam. The UL common beam indication may not be signaled. In some implementations, only the UL common beam may be indicated and the DL common beam may follow the UL common beam. The DL common beam indication may not be signaled. For separate DL/UL common beam operation, both the DL common beam indication and the UL common beam indication may be signaled/indicated to the UE. The DL common beam indication and the UL common beam indication may be signaled/indicated to the UE separately.

A UE may report the support of common beam capability before the NW enables it by the RRC configuration. Capability signaling for supporting common beam operation may indicate the following (a)-(c).

(a) Generic support of common beam operation. The capability may indicate supporting the joint DL/UL common beam operation and the separate DL/UL common beam operation. The capability may indicate supporting the DL common beam operation and the UL common beam operation.

(b) Support for separate DL/UL common beam operation. The capability may indicate supporting the DL common beam operation and the UL common beam operation.

(c) Support for joint DL/UL common beam operation. The capability may indicate supporting the DL common beam operation or the UL common beam operation.

Dependent on system design, M common beam(s) may be assumed, where M=1 or M>1. While M=1 may simplify system design, M>1 may find its application in, for example, a multi-Transmission Reception Point (TRP) scenario. M=1 may be restricted to a single-TRP scenario. M>1 may be required for an inter-cell multi-TRP scenario. M>1 may be required for a generic multi-TRP scenario. It is noted that a multi-TRP scenario may be identified based on RRC parameter(s). For example, when parameter CORESETPoolIndex is not configured for any CORESET, or no CORESET is configured with parameter CORESETPoolIndex≥1, a single-TRP scenario may be assumed. For differentiating between an intra-cell multi-TRP and an inter-cell multi-TRP, additional parameter(s) may be needed.

At least for separate DL/UL common beam operation, UL common beam operation is likely needed. For a UL beam indication purpose, a spatial transmission property, which indicates spatial transmission filter information (e.g., beam information) for a UE to transmit a channel(s)/signal(s) may be provided in the form of spatial relation information as in NR UL (as specified in the 3GPP TS 38.213 V16.2.0 and the 3GPP TS 38.331 V16.1.0) or in similar form of NR DL TCI state (as specified in the 3GPP TS 38.214 V16.2.0 and the 3GPP TS 38.331 V16.1.0). The spatial transmission property may be provided by referring to a source RS. A UE may acquire the spatial transmission property by assuming a same spatial transmission property used for transmitting the source RS. From UL common beam configuration perspectives, the MAC-CE-based indication and the DCI-based indication may be applied for the common beam indication.

For a MAC-CE-based indication, the common beam indication may be signaled/updated by a MAC-CE signaling. A first set of spatial transmission properties may be configured by e.g., RRC signaling. A second set of spatial transmission properties may be activated for a common beam transmission purpose by MAC-CE signaling. The second set of spatial transmission properties may be a subset of the first set of spatial transmission properties. The cardinality of the second set of spatial transmission properties may be equal to or greater than one. The spatial transmission property in the second set may correspond to M different common beams. The spatial transmission property may be one-to-one mapped to individual common beams. The spatial transmission property may be grouped. An individual spatial transmission property group may correspond to an individual common beam. A spatial transmission property group may include one or more spatial transmission properties.

For a DCI-based indication, the common beam indication may be signaled/updated by DCI content. A code point in a DCI field may be used to select one or a subset of candidate spatial transmission properties dynamically. The MAC-CE or RRC signaling may determine/provide a list of the candidate spatial transmission properties. A number of selected spatial transmission properties may be greater than one if M>1. The DCI may indicate which common beam is updated by a common beam (index) carried or indicated by the same DCI, for example, when M>1. The DCI may not contain information related to reception of a PDSCH transmission. The DCI may not schedule a PUSCH transmission or may not include valid information for scheduling a PUSCH transmission.

Based on the MAC-CE-based indication and the DCI-based indication described above, different UL channels/signals may be associated with M different common beam(s). The PUCCH resources may be grouped. Individual groups of PUCCH resources may correspond to individual common beams. The grouping may be based on the PUCCH-resource group RRC parameter as specified in the 3GPP TS 38.331 V16.1.0. The dynamic grant (DG) PUSCH transmission may follow the DL common beam (index) used by scheduling DCI of the DG PUSCH. The dynamic grant (DG) PUSCH transmission may be based on an indication from content of a scheduling DCI of the DG PUSCH. The configured grant (CG) PUSCH transmission may be configured with a UL common beam (index) by RRC, for example, type-1 CG. The configured grant (CG) PUSCH transmission may be indicated by a UL common beam (index) in DCI that activates the CG PUSCH, for example, type-2 CG. The Physical Random Access Channel (PRACH) transmission beam for a contention-free random access procedure (as a result of a PDCCH order) may follow the DL common beam used by the PDCCH order. The PRACH transmission beam for a contention-free random access procedure (as a result of a PDCCH order) may be based on an indication in content of a scheduling DCI of the PDCCH order.

The common beam indication may provide one or more beam information. For example, when M>1, the common beam indication may include up to M pieces of beam information. This may be applicable for the MAC-CE-based indication and the DCI-based indication described above. For beam indication signaling which includes more than one beam information, the mapping of individual beam information to individual common beams may be (pre-)specified/(pre-)configured. The beam information may be provided in the form of spatial relation information such as NR UL in the 3GPP TS 38.213/214 V16.2.0. The beam information may be provided in the form of a TRP-related index (value), e.g., CORESETPoolIndex. The beam information may be provided in the form of a panel-related index (value) (e.g., panel index, antenna group index, or an associated DL/UL resource set index (e.g., CSI-RS resource set, or SRS resource set)). The beam information may be provided in the form of an antenna port indication. For common beam update, when indicated with a new common beam, an old beam may be applied until a specific condition is met. For example, a fixed time offset after HARQ-ACK transmission corresponding to the PDCCH and/or PDSCH which schedules/carries the common beam update information. The fixed time offset may be relative to the ending symbol of the PDCCH or the PDSCH.

While the common beam indication may be applied to as many channels/signals as possible from signaling overhead perspective, it may not be the same from functionality perspectives of various channels/signals. Specifically, due to different purposes designed for different channels/signals, a commonly indicated beam may not be suitable for specific channels/signals. In the following, the channels/signals (a)-(e) which may not operate based on beam information indicated by common beam indication are provided.

(a) Sounding Reference Signal (SRS) resources for beam management (BM) corresponding to an SRS resource set whose usage is set to "beamManagement." If the SRS for BM resources are configured, the common beam indication applicable to UL may not be applicable to SRS for BM. SRS resources for BM may not be configured when common beam indication applicable to UL is enabled/signaled.

(b) SRS resources for non-codebook (NCB) transmission corresponding to an SRS resource set whose usage is set to "noncodebook." NCB-based PUSCH transmission may not be configured, when separate DL/UL common beam is applied and/or when DL common beam and UL common beam signaling is performed independently.

(c) PUSCH with its transmission mode configured by RRC parameter txConfig to "nonCodebook" mode.

(d) PRACH channel: The PRACH channel may not follow beam information indicated by common beam signaling. For example, a PRACH related to message 1 from contention-based random access process and/or a PRACH part from message A of a 2-step random access channel.

(e) SRS for positioning

Common beam update may be subject to a fixed application latency for either DCI-based or MAC-CE-based update signaling. The latency may be (pre-)specified/(pre-)configured. In 3GPP NR Rel-15/16, when beam indication signaling for different channels/signals is provided separately/independently, there may be ambiguity with regard to which beam to apply for certain channel(s)/signal(s) during a certain time period.

Due to common beam nature, occasions for such beam ambiguity may be reduced, but not eliminated. Default beam behavior may be needed when, for example, more than one common beam is indicated, specifically M>1. From a UE complexity perspective, a UE may support reception by applying different DL beams at the same time. However, it may not be true for UL, specifically the UE may not support transmission with two different spatial transmission properties at the same time.

For common beam operation, if M (where M>1) common beams are signaled or activated for operation, the default beam may be based on the following features (a)-(c).

(a) The default beam may be applied for UL channels/signals, for example, PUCCH/PUSCH/SRS. The default beam behavior may be implemented by applying PUCCH/SRS/PUSCH default behavior in 3GPP NR Rel-16. For example, by not configuring PUCCH-SpatialRelationInfo, and enabling a default beam for PUCCH/SRS and PUSCH by the NW. If PUCCH-SpatialRelationInfo is configured, it may be ignored.

(b) The default beam behavior may be one or a combination of the following features (b1)-(b3).

(b1) AP PUCCH/SRS and/or PUSCH may follow a triggering PDCCH. The association between the triggering PDCCH and UL transmission may be via an RRC configuration or DCI content, if needed. For example, the RRC configuration may be UE-specific and according to a per-TRP manner. The AP PUCCH may be a PUCCH transmission(s) triggered by DL PDCCH/PDSCH reception. P/SP PUCCH and/or P/SP SRS may follow a (pre-)specified/(pre-)configured common beam group/index. P/SP PUCCH may be configured by RRC signaling for, e.g., CSI/beam reporting. SP PUCCH may also be activated by MAC-CE signaling for, e.g., SP CSI/beam reporting.

(b2) Extension of UL default beam behavior in 3GPP NR Rel-16. For example, the default beam behavior in 3GPP NR Rel-16 may be applied, modified or extended. The QCL assumption for the lowest CORESET-ID of CORESETs associated with one TRP or corresponding to one CORESETPoolIndex value in the cell (or Pcell), in 3GPP NR Rel-16, may be used as the default beam.

(b3) Grouping of PUCCH/SRS resources. Individual groups may be mapped to an associated common beam. The grouping may be based on RRC parameter PUCCH-resourcegroup.

(c) The channels/signals for which the default beam may be applicable may include the channels/signals other than those listed in bullets (a) to (e). The channels for which the default beam may be applicable may include PDSCH. The signals for which the default beam may be applicable may include a Phase Tracking-Reference Signal (PT-RS), a PUSCH DMRS, a Positioning Reference Signal (PRS) and an SRS, but other than the signals listed in bullets (a) to (e).

(d) The default beam may be applied for one or more DL channels or RSs. In some implementations, the joint DL/UL common beam operation may be configured/enabled by the NW. In some implementations, only a UL common beam indication may be signaled. The signal beam may be applicable to DL channels/signals, as well as the default beam.

FIG. 1 is a flowchart illustrating a method 100 performed by a UE for beam indication for uplink (UL) transmission according to an example implementation of the present disclosure. Although actions 102, 104, 106, 108 and 110 are illustrated as separate actions represented as independent blocks in FIG. 1, these separately illustrated actions should not be construed as necessarily order dependent. The order in which the actions are performed in FIG. 1 is not intended to be construed as a limitation, and any number of the disclosed blocks may be combined in any order to implement the method, or an alternate method. Moreover, each of actions 102, 104, 106, 108 and 110 may be performed independent of other actions and can be omitted in some implementations of the present disclosure.

In action 102, the UE may receive a first configuration for configuring a plurality of first Transmission Configuration Indication (TCI) states. Each of the plurality of first TCI states may be applied for at least one Physical Uplink Control Channel (PUCCH) and at least one Physical Uplink Shared Channel (PUSCH).

In action 104, the UE may receive a Medium Access Control-Control Element (MAC-CE) for activating one or more first TCI states from the plurality of first TCI states.

In action 106, the UE may receive first Downlink Control Information (DCI) indicating one of the one or more first TCI states activated by the MAC-CE. The first DCI may include at least one field for indicating scheduling information for a Physical Downlink Shared Channel (PDSCH), the indicated scheduling information being invalid for the PDSCH. The first DCI may not be an uplink (UL) grant. The first DCI may be a UE-specific DCI or a common DCI. In some implementations, the UE may further receive a second configuration for configuring a second TCI state, and the MAC-CE received in action 104 may further be used to indicate to the UE the second TCI state. The second TCI state may be applied only for receiving a PDSCH scheduled by second DCI.

In action 108, the UE may transmit a Hybrid Automatic Repeat Request-Acknowledgement (HARQ-ACK) on a PUCCH resource determined by another one field in the first DCI in response to the reception of the first DCI. In some implementations, the indicated first TCI state may not be applied for the PUCCH resource used for transmitting the HARQ-ACK.

In action 110, the UE may transmit the at least one PUCCH and the at least one PUSCH based on a spatial transmitter (TX) parameter derived according to the indicated first TCI state after transmitting the HARQ-ACK. In some implementations, the UE may further transmit, after transmitting the HARQ-ACK, at least one of a periodic Sounding Reference Signal (SRS), a semi-persistent SRS, an aperiodic SRS, an SRS for beam management and a UL positioning reference signal based on the spatial TX parameter derived according to the indicated first TCI state. In some implementations, a Sounding Reference Signal (SRS) for beam management, an SRS for non-codebook (NCB) based transmission, a PUSCH for NCB-based transmission, a Physical Random Access Channel and an SRS for positioning may not be applied for the indicated first TCI state.

In the present disclosure, a beam indication medium for conveying common beam indication applicable at least for UL transmission(s) is introduced. In addition, the timing for applying the common beam indication is assured, which avoids misunderstanding of used beam between network and UE.

Figure 2:
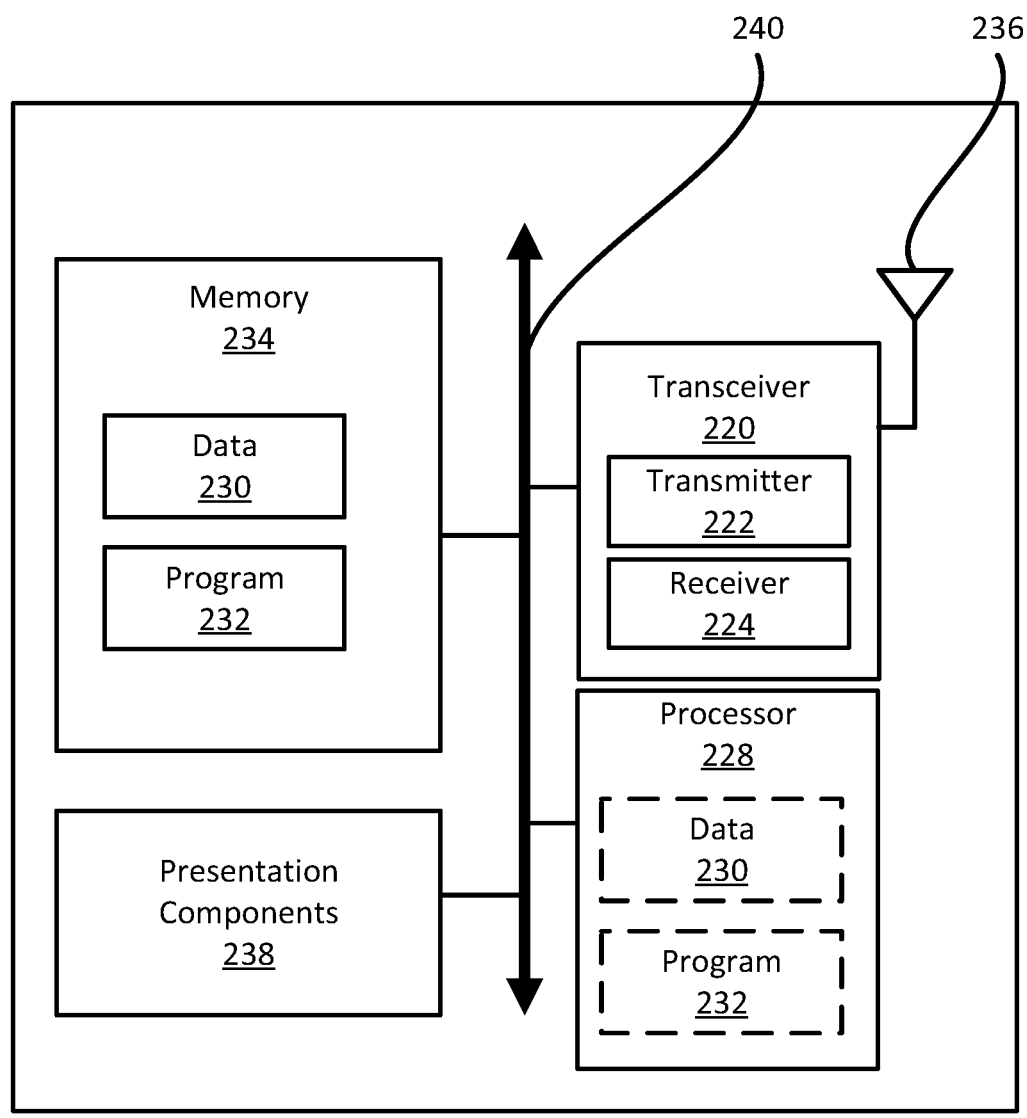
FIG. 2 is a block diagram illustrating a node for wireless communication according to an example implementation of the present disclosure.

FIG. 2 is a block diagram illustrating a node 200 for wireless communication according to an example implementation of the present disclosure. As illustrated in FIG. 2, a node 200 may include a transceiver 220, a processor 228, a memory 234, one or more presentation components 238, and at least one antenna 236. The node 200 may also include a radio frequency (RF) spectrum band module, a BS communications module, a network communications module, and a system communications management module, Input/Output (I/O) ports, I/O components, and a power supply (not illustrated in FIG. 2).

Each of the components may directly or indirectly communicate with each other over one or more buses 240. The node 200 may be a UE or a BS that performs various functions disclosed with reference to FIG. 1.

The transceiver 220 has a transmitter 222 (e.g., transmitting/transmission circuitry) and a receiver 224 (e.g., receiving/reception circuitry) and may be configured to transmit and/or receive time and/or frequency resource partitioning information. The transceiver 220 may be configured to transmit in different types of subframes and slots including but not limited to usable, non-usable and flexibly usable subframes and slot formats. The transceiver 220 may be configured to receive data and control channels.

The node 200 may include a variety of computer-readable media. Computer-readable media may be any available media that may be accessed by the node 200 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components may also be included within the scope of computer-readable media.

The memory 234 may include computer-storage media in the form of volatile and/or non-volatile memory. The memory 234 may be removable, non-removable, or a combination thereof. Example memory may include solid-state memory, hard drives, optical-disc drives, etc. As illustrated in FIG. 2, the memory 234 may store a computer-readable and/or computer-executable program 232 (e.g., software codes) that are configured to, when executed, cause the processor 228 to perform various functions disclosed herein, for example, with reference to FIG. 1. Alternatively, the program 232 may not be directly executable by the processor 228 but may be configured to cause the node 200 (e.g., when compiled and executed) to perform various functions disclosed herein.

The processor 228 (e.g., having processing circuitry) may include an intelligent hardware device, e.g., a Central Processing Unit (CPU), a microcontroller, an ASIC, etc. The processor 228 may include memory. The processor 228 may process the data 230 and the program 232 received from the memory 234, and information transmitted and received via the transceiver 220, the base band communications module, and/or the network communications module. The processor 228 may also process information to send to the transceiver 220 for transmission via the antenna 236 to the network communications module for transmission to a CN.

One or more presentation components 238 may present data indications to a person or another device. Examples of presentation components 238 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for beam indication for uplink (UL) transmission, the method comprising:
    receiving a first configuration for configuring a plurality of first Transmission Configuration Indication (TCI) states, each of the plurality of first TCI states applied to at least one Physical Uplink Control Channel (PUCCH) and at least one Physical Uplink Shared Channel (PUSCH);
    receiving a Medium Access Control (MAC)-Control Element (CE) for activating one or more first TCI states from the plurality of first TCI states;
    receiving first Downlink Control Information (DCI) indicating one of the one or more first TCI states activated by the MAC-CE, the first DCI comprising invalid scheduling information for a Physical Downlink Shared Channel (PDSCH) reception;
    transmitting a Hybrid Automatic Repeat Request (HARQ)-Acknowledgement (ACK) on a first PUCCH determined by a field in the first DCI in response to the reception of the first DCI; and
    transmitting the at least one PUCCH and the at least one PUSCH based on a spatial transmitter (TX) parameter derived according to the indicated one of the one or more first TCI states after transmitting the HARQ-ACK, the at least one PUCCH being different from the first PUCCH, wherein
    a second TCI state, different from the indicated one of the one or more first TCI states, is applied to the first PUCCH.

2. The method of claim 1, further comprising:
    receiving a second configuration for configuring a third TCI state, wherein the MAC-CE is used to indicate to the UE the second TCI state.

3. The method of claim 2, wherein the third TCI state is applied only for receiving a PDSCH scheduled by second DCI.

4. The method of claim 1, wherein the first DCIS does not indicate an uplink (UL) grant.

5. The method of claim 1, wherein the first DCI is a UE-specific DCI or a common DCI.

6. The method of claim 1, further comprising:
    transmitting, after transmitting the HARQ-ACK, at least one of a periodic Sounding Reference Signal (SRS), a semi-persistent SRS, an aperiodic SRS, an SRS for beam management, and a UL positioning reference signal based on the spatial TX parameter derived according to the indicated one of the one or more first TCI states.

7. The method of claim 1, wherein at least one of a Sounding Reference Signal (SRS) for beam management, an SRS for non-codebook (NCB)-based transmission, a PUSCH for NCB-based transmission, a Physical Random Access Channel, and an SRS for positioning is not applied for the indicated one of the one or more first TCI states.

8. A user equipment (UE) for beam indication for uplink (UL) transmission, the UE comprising:
- one or more non-transitory computer-readable media storing computer-executable instructions; and
- at least one processor coupled to the one or more non-transitory computer-readable media, the at least one processor configured to execute the computer-executable instructions to:
  - receive a first configuration for configuring a plurality of first Transmission Configuration Indication (TCI) states, each of the plurality of first TCI states applied to at least one Physical Uplink Control Channel (PUCCH) and at least one Physical Uplink Shared Channel (PUSCH);
  - receive a Medium Access Control (MAC)-Control Element (CE) for activating one or more first TCI states from the plurality of first TCI states;
  - receive first Downlink Control Information (DCI) indicating one of the one or more first TCI states activated by the MAC-CE, the first DCI comprising invalid scheduling information for a Physical Downlink Shared Channel (PDSCH) reception;
  - transmit a Hybrid Automatic Repeat Request (HARQ)-Acknowledgement (ACK) on a first PUCCH determined by a field in the first DCI in response to the reception of the first DCI; and
  - transmit the at least one PUCCH and the at least one PUSCH based on a spatial transmitter (TX) parameter derived according to the indicated one of the one or more first TCI states after transmitting the HARQ-ACK, the at least one PUCCH being different from the first PUCCH, wherein
    a second TCI state, different from the indicated one of the one or more first TCI states, is applied to the first PUCCH.

9. The UE of claim 8, wherein the at least one processor is further configured to execute the computer-executable instructions to:
- receive a second configuration for configuring a third TCI state, wherein the MAC-CE is used to indicate to the UE the second TCI state.

10. The UE of claim 9, wherein the third TCI state is applied only for a PDSCH scheduled by second DCI.

11. The UE of claim 8, wherein the first DCI does not indicate an uplink (UL) grant.

12. The UE of claim 8, wherein the first DCI is a UE-specific DCI or a common DCI.

13. The UE of claim 8, wherein the at least one processor is further configured to execute the computer-executable instructions to:
- transmit, after transmitting the HARQ-ACK, at least one of a periodic Sounding Reference Signal (SRS), a semi-persistent SRS, an aperiodic an SRS, an SRS for beam management, and a UL positioning reference signal based on the spatial TX parameter derived according to the indicated one of the one or more first TCI states.

14. The UE of claim 8, wherein at least one of a Sounding Reference Signal (SRS) for beam management, an SRS for non-codebook (NCB)-based transmission, a PUSCH for NCB-based transmission, a Physical Random Access Channel, and an SRS for positioning is not applied for the indicated one of the one or more first TCI states.

* * * * *